June 17, 1952  V. R. KIMBALL ET AL  2,600,546
INDUCTANCE TYPE PICK-OFF
Filed Jan. 3, 1949
FIG. 1
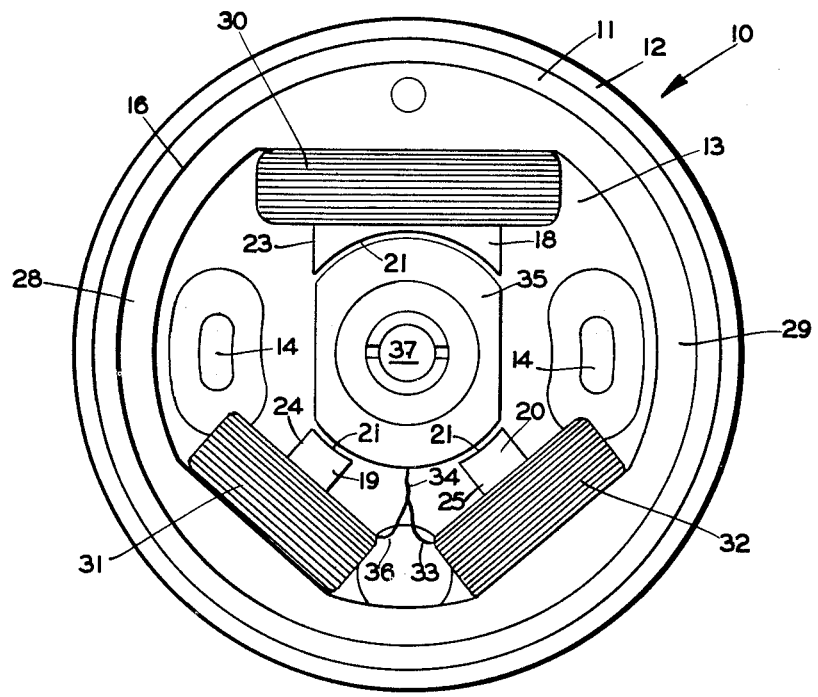
FIG. 2
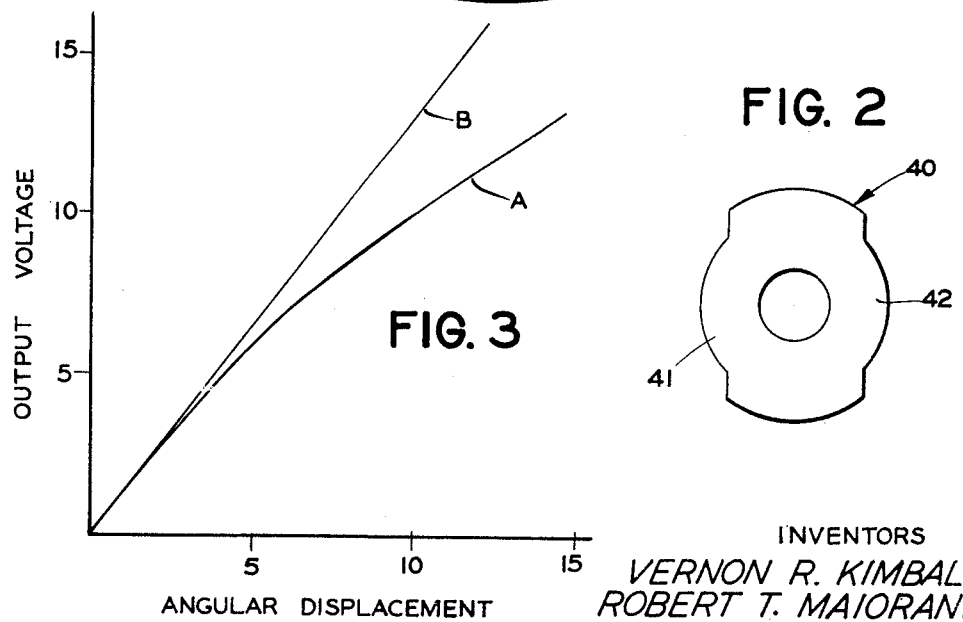
FIG. 3
INVENTORS
VERNON R. KIMBALL
ROBERT T. MAIORANY
BY
ATTORNEY Patented June 17, 1952

2,600,546

UNITED STATES PATENT OFFICE 2,600,546

INDUCTANCE TYPE PICK-OFF

Vernon R. Kimball, Maywood, N. J., and Robert T. Maiorany, Bronx, N. Y., assignors to Bendix Aviation Corporation, Teterboro, N. J., a corporation of Delaware Application January 3, 1949, Serial No. 68,772

9 Claims. (Cl. 171—119)

The present invention relates to an inductance type pick-off which develops an electrical signal in response to the relative displacement of one member with another.

An object of our present invention is to provide a novel inductance type pick-off in which the signal voltage output is linear with respect to the angular displacement of a member from a zero or null position.

A further object of this invention is to provide a pick-off of the character indicated in which the phase of the signal voltage developed is responsive to the direction of angular displacement of a member from its null or zero position.

Another object of the present invention is to provide an inductance type pick-off of the character indicated in which a low excitation voltage is used to provide a relatively high signal voltage output.

Still another object of this invention is to provide a pick-off of the character indicated which shall consist of few and simple parts, relatively inexpensive to manufacture, have a large variety of application, which shall be positive and accurate in its operation and yet be practical and efficient to a high degree in use.

Other objects of this invention will in part be obvious and in part hereinafter pointed out.

In the accompanying drawings forming a part of this specification in which two illustrative embodiments of our invention are illustrated, Fig. 1 is a plan view of the novel inductance type pick-off, Fig. 2 is a plan view of an armature of the second embodiment of this invention, while Fig. 3 is a graph showing the signal voltage output of both embodiments of the invention plotted against angular displacement of the armature.

Referring now in detail to Fig. 1 of the drawings in which the first embodiment of our invention is illustrated, the numeral 10 designates our novel inductance type pick-off. The pick-off is fixed within an annular case 11 provided with a flange 12 at the bottom edge thereof; the bottom wall 13 of the case being provided with two elongated slots 14 for adjustably mounting the unit, as will hereinafter more fully appear.

Fixed within the case 11 is an annular core structure 16 made up of a plurality of laminations of permeable material (not shown), the laminations being formed with inwardly extending radial legs 18, 19 and 20 terminating in arcuate edges 21. The legs 18 of the stacked laminations forming the pole 23 are considerably wider than the legs 19 and 20 forming the poles 24 and 25, respectively. The arcuate sections 28 and 29 of the core 16 interconnecting the poles 23, 24 and 25 are of the same width as the poles 24 and 25.

Wound about the pole 23 is an excitation coil 30 which is adapted to be connected across a source of alternating current. Wound about the poles 24 and 25 are two secondary coils 31 and 32, respectively; said coils being connected in series opposed relation by the coil ends 36 and 33 connected to a common lead 34. The opposite ends (not shown) of the two coils form the output of the device.

An armature 35 is provided for the pick-off made of stacked laminations of highly permeable material (not shown). The armature is adapted to be fixed to a shaft 37, the angular displacement of which is to be indicated. It will be noted that the armature 35 is of elongated construction, the ends being arcuate to provide a small air gap between the poles while the sides are straight and parallel. The width measured between the parallel sides is approximately equal to the width of the pole piece 23.

With the armature in the null position shown in Fig. 1 the armature opposes the entire arcuate faces 21 of poles 23, 24, 25. When the excitation coil 30 is connected across a suitable source of alternating current, the magnetic flux lines created by the alternating current in the excitation coil will pass through the armature 35 and divide equally between the poles 24 and 25. Since the flux linkages in both secondary pole pieces are equal, the voltages induced in each of the secondary coils 31 and 32 will be equal. The two coils being connected in series opposed relation, the two equal voltages induced in the secondary coils will cancel each other so that no signal voltage will appear in the output of the device.

Angular displacement of the shaft 37 will displace the armature 35 relative to the poles 23, 24 and 25 and the area of the armature opposing the arcuate face 21 of pole 23 and of one pole 24 or 25 will decrease and the area of the armature opposing the arcuate face 21 of the other pole 24 or 25 will remain constant. With the displacement of the armature, the reluctance of the magnetic circuits described will be varied so that the voltage in one secondary winding will be greater than the voltage developed in the other secondary winding. The two coils 31 and 32 will thus provide a voltage output which is the algebraic sum of the voltage induced in the respective coils. The signal voltage obtained will vary in amplitude in accordance with the degree of angular displacement of the armature from its zero or null position, while the phase of the signal voltage will be dependent upon the direction of angular displacement of the armature from its null position.

In Fig. 3 the curve designated A is characteristic of the voltage output of the pick-off shown in Fig. 1. It will be noted that the response of the device is linear to approximately 7° of angular displacement at which point the curve makes a sharp bend and is again linear but at a different slope than the lower portion of the curve.

To provide a linear response of the device over the range of 15° displacement on either side of the null position, the armature 40 illustrated in Fig. 2 is provided. The armature 40 differs from the armature 35 of Fig. 1 in that additional ferrous material is placed in the magnetic circuit of the device, the additional material taking the form of two arcuate sections 41 and 42 on the heretofore parallel sides of the armature. The arcuate sections 41 and 42 now forming a part of the armature are such that the cross-sectional areas thereof are equal to the cross-sectional areas of the pole pieces 24 and 25 and the arcuate sections 28 and 29 of the core 16.

By providing two equal low reluctance paths for the magnetic flux, the output characteristic of the device becomes linear throughout its entire range as shown by the curve B of Fig. 3. It will be noted that the output of pick-off using an armature of the character illustrated in Fig. 2 is approximately one volt per degree of angular displacement.

In order that a null position of the armature may be obtained when the armature is fixed to a rotatable shaft, the slots 14 in the bottom wall of the case 11 provide the necessary means for adjusting the relative position of the primary and secondary poles with respect to the armature 35.

It will thus be seen that there is provided an inductance type pick-off in which the several objects of this invention are achieved and which is well adapted to meet the conditions of practical use.

As various embodiments might be made of the above invention, and as various changes might be made in the embodiments above set forth, it will be understood that all matter herein set forth, or shown in the accompanying drawings is to be interpreted as illustrative and not in a limiting sense.

Having thus described our invention, we claim as new and desire to secure by Letters Patent:

1. A pick-off comprising an annular magnetic core, three inwardly extending radial legs on said core, two of said legs having the same cross-sectional area and smaller than the cross-sectional area of the third leg; a coil wound about each core, the coils about the smaller legs being connected in series opposed relation, the third coil being adapted to be connected across a source of alternating current; and an elongated armature of permeable material rotatable within the core and shaped and arranged so that upon rotation of said armature the area of said armature opposing one of said two legs decreases and the area of said armature opposing the other of said two legs remains constant, thereby producing a signal responsive to the angular displacement of the armature by changing the reluctance of the magnetic circuit interconnecting said radial legs.

2. A pick-off comprising an annular magnetic core, three inwardly extending radial legs on said core, two of said legs having the same cross-sectional area and smaller than the cross-sectional area of the third leg; a coil wound about each core, the coils about the smaller legs being connected in series opposed relation, the third coil being adapted to be connected across a source of alternating current; and an armature of permeable material having an effective cross-sectional area throughout its length equal at least to the combined cross-sectional areas of the two smaller legs and rotatable within said core, said armature being shaped and arranged so that in null position the armature opposes the third leg and substantially the entire adjacent faces of said two legs, and upon rotation of said armature, the area of said armature opposing one of said two legs decreases and the area of said armature opposing the other of said two legs remains constant, thereby changing the reluctance of the magnetic circuit interconnecting said radial legs to produce a signal voltage responsive in phase and amplitude to the direction and degree of angular displacement of the armature.

3. In a device of the kind described, a core member having three legs and an armature member closely associated therewith, one of said members being movable relative to the other member, a primary winding on one of said legs and series opposed secondary windings on the other pair of said legs, said armature member being of permeable material and in null position opposing said one leg and opposing the entire adjacent faces of said pair of legs, and the area of said armature member opposing one leg of said pair decreasing with relative movement of said members to produce a signal in said secondary windings.

4. In a device of the kind described, a core member having three legs and an armature member associated therewith, one of said members being movable relative to the other member, a primary winding on one of said legs and series opposed secondary windings on the other pair of said legs, said armature member being of permeable material and being shaped and arranged to oppose said legs in null position and upon relative movement of said members, the area of said armature member opposing one leg of said pair decreasing and the area of said armature member opposing the other leg of said pair remaining constant, whereby a signal is induced in said secondary windings.

5. In a device of the kind described, a core member having three legs and an armature member closely associated therewith, one of said members being movable relative to the other member, a primary winding on one of said legs and series opposed secondary windings on the other pair of said legs, said armature member being of permeable material and being shaped and arranged so that in null position the armature opposes said one leg and substantially the entire adjacent faces of said pair of legs and upon relative movement of said members, the area of said armature member opposing one leg of said pair decreases, and the area of said armature member opposing the other leg of said pair remains constant, whereupon a signal is induced in said secondary windings as a linear function of the relative movement of the members by changing the reluctance of the magnetic circuits interconnecting said legs.

6. In a device of the kind described, a core member having three legs and an armature member associated therewith, one of said members being movable relative to the other member, two of said legs being of substantially the same cross-sectional area and smaller than the cross-sectional area of the third leg, a primary winding on said third leg and series opposed secondary windings on said two legs, said armature member being of permeable material and in null position opposing the entire adjacent faces of said two legs and opposing said third leg and the area of said armature member opposing one of said two legs decreasing with relative movement of said members to produce a signal in said secondary windings.

7. A pick-off comprising an annular magnetic core, three inwardly extending radial legs on said core, a primary winding on one of said legs and series opposed secondary windings on the other pair of said legs, an armature of permeable material rotatable within said core and in null position opposing said one leg and opposing the entire adjacent faces of said pair of legs, and the area of said armature member opposing one leg of said pair decreasing with relative movement of said members to produce a signal in said secondary winding.

8. In a device of the kind described, an annular magnetic core member having three radially extending legs and an armature member closely associated therewith, one of said members being rotatable relative to the other member, a primary winding on one of said legs and series opposed secondary windings on the other pair of said legs, said armature being of permeable material and being shaped and arranged so that in null position the armature opposes said one leg and substantially the entire adjacent faces of said pair of legs, and upon relative rotation of said members, the area of said armature member opposing one leg of said pair decreases, and the area of said armature member opposing the other leg of said pair remains constant, whereby a signal is induced in said secondary windings.

9. In a device of the kind described, a core member having three legs and an armature member closely associated therewith, one of said members being movable relative to the other member, a primary winding on one of said legs and series opposed secondary windings on the other pair of said legs, said armature member being of permeable material and being shaped and arranged so that in null position, the armature opposes said one leg and substantially the entire adjacent faces of said pair of legs and upon relative movement of said members, the area of said armature member opposing one leg of said pair decreases, and the area of said armature member opposing the other leg of said pair remains constant, whereupon a signal is induced in said secondary windings, the effective cross-sectional area of said one leg and of the armature each being equal at least to the combined effective cross-sectional areas of said pair of legs.

VERNON R. KIMBALL.
ROBERT T. MAIORANY.

REFERENCES CITED

The following references are of record in the file of this patent:

UNITED STATES PATENTS

| Number | Name | Date |
|---|---|---|
| 2,164,915 | Hall | July 4, 1939 |
| 2,379,417 | Conrad | July 3, 1945 |
| 2,442,751 | Abbot | June 8, 1948 |

FOREIGN PATENTS

| Number | Country | Date |
|---|---|---|
| 494,607 | Great Britain | Oct. 28, 1938 |
| 555,042 | Germany | July 19, 1932 |